United States Patent [19]

Ramet et al.

[11] Patent Number: 4,468,337
[45] Date of Patent: Aug. 28, 1984

[54] PROCESS FOR THE HEATING AND/OR THERMAL CONDITIONING OF A BUILDING BY MEANS OF A HEAT PUMP OPERATED WITH A SPECIFIC MIXTURE OF WORKING FLUIDS

[75] Inventors: Claude Ramet, Paris; Alexandre Rojey, Garches, both of France

[73] Assignee: Institut Francais du Petrole, Rueil-Malmaison, France

[21] Appl. No.: 532,128

[22] Filed: Sep. 14, 1983

Related U.S. Application Data

[63] Continuation of Ser. No. 381,903, May 25, 1982, Pat. No. 4,428,853.

[30] Foreign Application Priority Data

Oct. 19, 1981 [FR] France ................. 81 19734

[51] Int. Cl.$^3$ ............................. C09K 5/04
[52] U.S. Cl. ..................... 252/67; 62/116; 62/118
[58] Field of Search ......................... 252/67

[56] References Cited

U.S. PATENT DOCUMENTS 3,300,996  1/1967  Atwood ................. 62/513
3,851,494  12/1974  Hess ..................... 62/513

FOREIGN PATENT DOCUMENTS 11971    6/1980  European Pat. Off. .
1063416  3/1967  United Kingdom .
304282   5/1971  U.S.S.R. .................. 252/67

OTHER PUBLICATIONS

Geller et al., "Thermodynamic Properties of a Mixture of Freon 12 and 23", Kholod. Tekh. 1973, (6), 46–47.
Kazachki, "Critical Pressures and Temperatures of Some Nonazeotropic Mixtures", Sci. Tech. Froid. 1980, (1), 45–48.
Chaikovskii et al., "Experimental Investigation of Two-Step Refrigeration with a Mixture of Freons 12 and 23", Kholod. Tekh. 1972, (No. 4), p. 7.

Primary Examiner—John E. Kittle
Assistant Examiner—Robert A. Wax
Attorney, Agent, or Firm—Millen & White

[57] ABSTRACT

Buildings are advantageously heated or heat-conditioned with a heat pump operated with a non-azeotropic mixture of two working fluids. The mixture comprises 99 to 70% by mole of dichlorodifluoromethane (R 12), monochlorodifluoromethane (R 22) or one of the halohydrocarbon azeotropes R 500, R 501 or R 502 with 1 to 30% by mole of trifluoromethane (R 23) or the halohydrocarbon azeotrope R 503.

6 Claims, 2 Drawing Figures

PROCESS FOR THE HEATING AND/OR THERMAL CONDITIONING OF A BUILDING BY MEANS OF A HEAT PUMP OPERATED WITH A SPECIFIC MIXTURE OF WORKING FLUIDS

This is a continuation of application Ser. No. 381,903 filed May 25, 1982, now U.S. Pat. No. 4,428,853.

BACKGROUND OF THE INVENTION

The use of non-azeotropic fluid mixtures in a heat pump, in order to improve the performance coefficient of the heat pump, has been the object of prior French patents and patent applications (Pat. Nos. 2 337 855, 2 474 151, 2 474 666 and No. 2 497 931 corresponding respectively to U.S. Pat. No. 4,089,186, U.S. Pat. No. 4,344,292, U.S. Pat. No. 4,350,020 and U.S. application Ser. No. 339,565).

More specifically, the French Pat. No. 2 474 151 describes non-azeotropic mixtures of two constituents capable of increasing the performances of a heat pump and thus, to decrease the operating cost of said heat pump. The two constituent mixtures described therein do not increase, however, the thermal power of a given compressor.

The object of the present invention is to show that specific fluid mixtures can be used to increase the thermal power delivered by a heat pump, as compared to the case where the same pump operates with a pure fluid. It is thus possible to reduce the investment cost by using the fluid mixtures of the invention in heat pumps. As a matter of fact the mixed working fluids of the invention result in an increase of the thermal capacity of a given heat pump, without modification of the parts of said heat pump, particularly without modification of the compressor.

Two conventional means are used to increase the thermal power of a heat pump; a first means consists of equipping the pump with a compressor of greater capacity, to thereby increase the drawn volume, but this technique increases the investment cost. The other means to increase the thermal capacity of a heat pump is to use a working fluid whose boiling point is lower than that of the conventional fluid. In fact, this substitution leads to a decrease of the performance coefficient and also to a narrower range of use of the pump, since the fluid of lower boiling point has generally a lower critical temperature.

The proposed invention concerns conventional applications of heat pumps, more particularly those wherein the usually employed working fluid is monochlorodifluoromethane (R 22; boiling point: $-40.8°$ C.) or dichlorodifluoromethane (R 12; boiling point: $-29.8°$ C.).

The above two fluids may be replaced, in conventional uses, with azeotropic mixtures of R 12 or R 22 with a halogen compound of close boiling point. These azeotropic mixtures have generally a boiling temperature slightly below that of R 12 or R 22 respectively and behave as pure fluids. Thus R 500, which consists of 73.8% b.w. of dichlorodifluoromethane R 12 (B.P.$=-29.8°$ C.) and 26.2% b.w. of difluoroethane R 152a (B.P.$=-24.75°$ C.), has a boiling point of $-33.5°$ C.; R 502, which consists of 48.8% b.w. of chlorodifluoromethane R 22 (B.P.$=-40.8°$ C.) and 51.2% b.w. of chloropentafluoroethane R 115 (B.P.$=-38.7°$ C.) has a boiling point of $-45.6°$ C. R 501, comprising 75% b.w. of chlorodifluoromethane R 22 and 25% b.w. of dichlorodifluoromethane R 12, whose boiling point (B.P.$=-41.4°$ C.) is very close to that of R 22, may also be mentioned.

The above-mentioned halogenated fluids are commonly employed in the heat pump installations used for heating or conditioning houses, for town heating and for low temperature industrial applications, such as certain operations of drying or concentration. The use of monochlorodifluoromethane (R 22) or of R 502 is quite common in the heat pumps used in house heating and making use, as a cold source, of underground water, water from wells or rivers, external air or extracted air, and, as heat source, of heating water or internal air, for temperatures which can reach 55° C. at the heat source.

The substitution of R 502 to R 22 in a heat pump does not substantially increase the thermal capacity; however it allows a substantial decrease of the output temperature. The use of R 12 or R 500 is particularly well adapted to relatively high temperature levels, for example higher than 50° C. and lower than 80° C.

SUMMARY OF THE INVENTION

The principle of the invention consists of selecting a specific mixture of fluids which do not form a common azeotrope, said mixture being characterized in that it is composed of a major component, which may be monochlorodifluoromethane (R 22) or dichlorodifluoromethane (R 12) or an azeotrope containing one of these fluids, and a minor component of lower boiling point, which is trifluoromethane (R 23; boiling point: $-82.1°$ C.) or an azeotrope comprising R 23. More specifically, the mixture comprises 99 to 70% by mole of one of the following fluids: R 12, R 500, R 22, R 502 or R 501, and 1 to 30% by mole of R 23 or R 503, the latter being an azeotropic mixture comprising 40.1% of R23 and 59.9% of chlorotrifluoromethane (R 13)b.w.

In the cycle of a given heat pump, under identical running conditions, the evaporation pressure of a mixture of the above type is higher, under otherwise unchanged conditions, than the evaporation pressure of the major constituent thereof when used in pure state.

Consequently, the molar volume of the vapor sucked by the compressor is lower, which, for a compressor of a given capacity, increases the molar flow rate of the fluid and thus, the thermal capacity of the heat pump. Moreover, the use of a mixed working fluid comprising a major constituent (R 22 or R 12 or R 500 or R 501 or R 502) and a minor constituent (R 23 or R 503) of lower boiling temperature generally results in a reduction of the compression rate. This increases the volumetric yield in the case of reciprocating compressors and is thus also favorable to an increase of the thermal capacity. The greater the molar concentration of the minor constituent, the higher the thermal capacity. The molar fraction of the minor constituent (R 23 or R 503) must be selected between 1 and 30%, preferably between 5 and 20%; and as a matter of fact, a too high proportion of this constituent results in a decrease of the performance coefficient and in an excessive condensation pressure. As a matter of fact, the compressors have a domain of use limited by certain working parameters (maximum output temperature and pressure; maximum pressure difference). The condensation pressure of a mixture conforming to the invention is preferably lower than 30 bars.

The mixtures of fluids proposed in this invention can be used more particularly when the temperature of the warm source is comprised, preferably, between 20° and 75° C. and that of the cold source, preferably, between −15° and +40° C.

The heat pumps to be operated with the above mixtures may be of any type. The compressor may be, for example, a lubricated piston compressor, a dry piston compressor, a screw compressor or a centrifuge compressor. The exchangers may be for example, double pipe exchangers, shell-and-tube exchangers, plate exchangers or conventional finned exchangers for heat transfer with air. A countercurrent heat exchanger mode is preferred; the latter is well performed in the case of coaxial exchangers as used for water/coolant exchanges in heat pumps of small power. It may be performed approximately in the air/coolant exchangers disclosed in the French Pat. No. 2 474 666. The thermal power obtained may vary, for example, between a few kilowatts for heat pumps used in domestic heating and several megawatts for heat pumps destined to collective heating.

DETAILED DISCUSSION OF THE INVENTION

A preferred embodiment is disclosed in the French application No. 81/00 847.

This embodiment comprises the following steps:

(a) the mixed working fluid is compressed in the vapor phase, (b) the compressed mixed fluid issued from step (a) is contacted in thermal exchange relationship with a relatively cold external fluid and said contact is maintained up to the substantially complete condensation of said mixed fluid, (c) the substantially completely condensed mixed fluid issued from step (b) is contacted in thermal exchange relationship with a cooling fluid as defined in step (f), so as to further cool said mixed fluid, (d) the cooled mixed fluid issued from step (c) is expanded, (e) the expanded mixed fluid issued from step (d) is contacted in thermal exchange relationship with an external fluid which forms the heat source, the conditions of contact providing for the partial vaporization of said expanded mixed fluid, (f) the partially vaporized mixed fluid issued from step (e) is contacted in heat exchange relationship with the substantially entirely liquefied mixed fluid fed to step (c), said partially vaporized mixed fluid forming the cooling fluid of said step (c), the contact conditions being such as to complete the vaporization partially effected in step (e) and (g) the vaporized mixed fluid issued from step (f) is fed back to step (a).

The following examples illustrate operations performed with specific fluid mixtures conforming to the invention.

EXAMPLE 1

Figure 1:
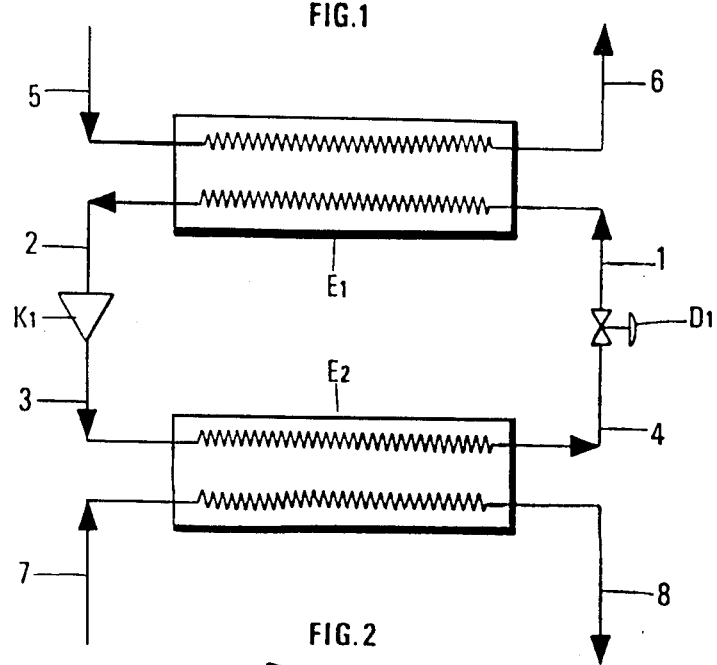
FIG. 1 schematically illustrates a typical heat pump arrangement for conducting the process of the invention.

The water/water heat pump of FIG. 1 comprises an evaporator E 1 wherein the mixture is introduced through duct 1 and wherefrom it is withdrawn in the vaporized state through duct 2, a compressor K 1 where the vapor mixture is compressed and wherefrom it is discharged through duct 3 to be fed to condenser E 2, wherefrom it is withdrawn in the condensed state through duct 4; it is then expanded through expansion valve D 1 and recycled to the evaporator. The evaporator and the condenser consist of double-tube exchangers wherethrough the fluids participating to the thermal exchange circulate in counter-current.

The cold source consists of water withdrawn from an underground field. This water is fed to evaporator E 1 through duct 5 at a temperature of 12° C. and withdrawn from evaporator E 1 through duct 6 at a temperature of 5° C.

The water which is heated in condenser E 2 is supplied through duct 7 and discharged through duct 8.

Two operating manners are contemplated, depending on the nature of the heating system and the water return temperature.

A—Heating by radiators:

Temperature of the water returned to the condenser: 42° C. (line 7); temperature to which water is heated: 50° C. (line 8).

B—Heating by heating floors:

Temperature of the water returned to the condenser: 20.5° C.; temperature to which water is heated: 34° C.

The flow rates of water in the evaporator and in the condenser depend on the capacity of the heat pump corresponding to the working fluid employed.

The following Table I shows the results obtained in case A and in case B when:

the heat pump is operated with pure chlorodifluoromethane (R 22), the heat pump is operated with a non-azeotropic mixture comprising: 85% by mole of chlorodifluoromethane (R 22) and 15% by mole of trifluoromethane (R 23).

COP represents the ratio of the delivered thermal power to the compression power transmitted to the fluid.

TABLE I

| WORKING CONDITIONS | A | | B | |
|---|---|---|---|---|
| Fluid | R22 | mixture R22/R23 | R22 | mixture R22/R23 |
| Thermal power (W) | 14260 | 17101 | 14820 | 18376 |
| COP | 3.52 | 3.48 | 4.56 | 4.63 |
| Input pressure (bars) | 4.65 | 5.72 | 4.50 | 5.62 |
| Output pressure (bars) | 20.64 | 25.13 | 15.15 | 18.42 |
| Compression rate | 4.44 | 4.39 | 3.37 | 3.28 |

The proposed mixture, as compared to pure R 22 for identical temperature conditions at the hot and the cold sources, gives a 20% increase of the thermal capacity in case A and a 24% increase in case B, the COP being practically unchanged in both cases.

The thermal power and the COP obtained with the R22/R23 mixture are also noticeably higher than those obtained with the azeotrope R 502 when used alone. For example, in case A, R 502 gives a thermal power of 14545 W—i.e. a gain of only 2% with respect to pure R 22—and a COP of 3.26. More generally, the composition of the proposed mixtures may be optimized to obtain a gain of thermal capacity higher than 20%, as compared with a pure fluid, and a COP identical to that of the reference pure fluid. These performances cannot be obtained by substituting, for example, R 502 to R 22 or R 500 to R 12.

The French Pat. No. 2 474 151 mentioned a mixture composed of R 22 and chlorotrifluoromethane R 13

(B.P.=−81.4° C.). The results obtained with this mixture comprising 85% by mole of R 22 and 15% by mole of R 13 are compared, in Table II, with those obtained when using the above R22/R23 mixture (85%/15%).

TABLE II

| MIXTURE | WORKING CONDITIONS | | | |
|---|---|---|---|---|
| | A | | B | |
| | R22/R23 | R22/R13 | R22/R23 | R22/R13 |
| Thermal power (W) | 17.101 | 16.214 | 18.376 | 17.488 |
| COP | 3.48 | 3.43 | 4.63 | 4.55 |
| Input pressure (bars) | 5.72 | 5.65 | 5.62 | 5.54 |
| Output pressure (bars) | 25.13 | 24.37 | 18.42 | 18.01 |
| Compression rate | 4.39 | 4.32 | 3.28 | 3.25 |

Thus, for practically identical working pressures, the R22/R23 mixture gives a heat power substantially higher than that obtained with the R22/R13 mixture.

The heating temperature attained with a heat pump of the water/water or air/water type operated with the R22/R23 mixture will be lower than 55° C. and preferably lower than or equal to 52° C. if it is desired that the output pressure be lower than 30 bars and preferably lower than 28 bars. The molar fraction of R 23 in a R22/R23 or R502/R23 mixture will preferably be comprised between 12% and 18%. The variations of the water temperature in the condenser will preferably be comprised between 5° C. and 15° C., in order to approach the condensation range of the mixtures proposed in the invention. In the case of a pure fluid, the condensation temperature is not substantially affected by the water return temperature, since it is basically higher than the heating temperature. Conversely, when using the proposed non-azeotropic mixtures in a counter-current water condenser, the temperature at the end of the condensation and the corresponding pressure depend directly on the temperature at which water is supplied to the condenser. Thus, in the above working case A, the condensation range for the mixture is 8° C., as well as the variation of the water temperature (42°-50° C.).

If the water heated by the heat pump must attain high temperatures, for example, temperatures higher than 60° C., dichlorodifluoromethane (R 12) or the azeotropic mixture R 500 may be substituted to chlorodifluoromethane (R 22), in order to decrease the upper pressure of the circuit. Thus a mixture, conforming to the invention, comprising dichlorodifluoromethane (R 12) associated with trifluoromethane (R 23) gives, under given working conditions, a greater thermal capacity than with pure R 12. Thus a mixture of a 87.5% molar fraction of R 12 with a 12.5% molar fraction of R 23 gives a 26% increase of the thermal capacity in case A, the pressure attained at the compressor output being lower than 17 bars.

The molar fraction of R 23 in a mixture of the R12/R23 or R500/R23 type will preferably be comprised between 8 and 18%. When using a water condenser, the heating temperature will be preferably lower than 75° C.

The working technique disclosed in the patent application No. 81/00847 has an additional advantage as concerns the thermal capacity when using a given non-azeotropic fluid mixture. This is the object of example No. 2.

EXAMPLE 2

Figure 2:
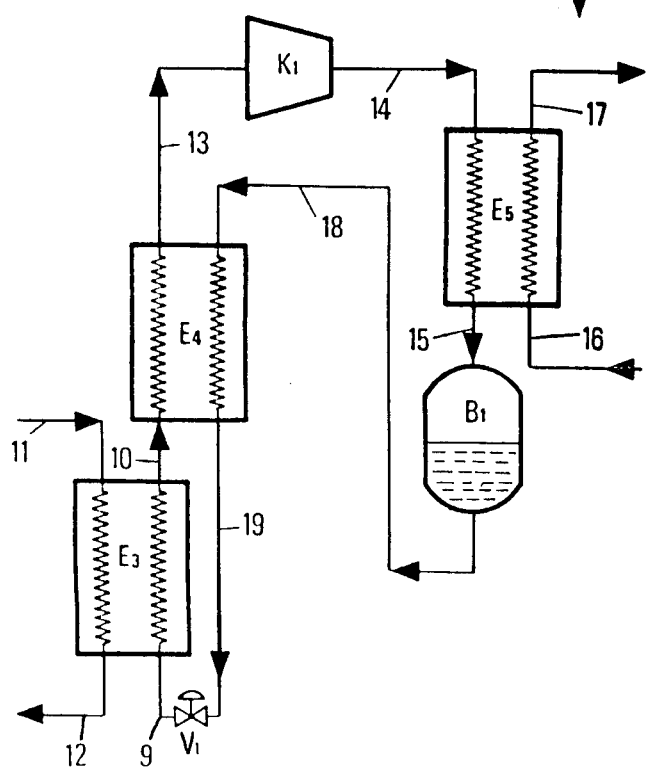
FIG. 2 schematically illustrates another arrangement for conducting the process of the invention.

The method of operation of the heat pump is shown in FIG. 2.

The mixed working fluid, discharged through duct 9 from the expansion valve, is partially vaporized in evaporator E 3 by the cooling effect of water from the cold source which circulates counter-currently to the working fluid and which is fed to evaporator E 3 through duct 11 and discharged therefrom through duct 12. The working fluid, discharged from evaporator E 3 through duct 10, is completely vaporized and optionally overheated in exchanger E 4, by counter-current exchange with the subcooled condensate supplied to E 4 through duct 18 and discharged through duct 19.

The mixed working fluid in gas state is drawn in by compressor K 1 through duct 13 and expelled at high pressure through duct 14. It is then subcooled and completely condensed in condenser E 5 where it is fed through duct 14 and discharged in the state of saturated liquid through duct 15. During the condensation in E 5, the mixture transfers useful thermal power to the heating water which, between the input duct 16 and the output duct 17, circulates counter-currently to the working fluid. The mixture, once condensed in E 5, is fed through duct 15 to the storage drum B 1 and discharged through duct 18; it is then subcooled in exchanger E 4 and fed to the expansion valve V 1 through duct 19.

As concerns the capacity, this arrangement provides an improvement when the working fluid is a non-azeotropic mixture of fluids, since the exchanger E 4, where the vaporization is terminated, allows the mixture to attain a higher final boiling temperature, and thus, an increased suction pressure. This process results both in a reduction of the molar volume at the suction point and in a decrease of the compression rate.

Table III shows the results obtained with the same mixture and under the same working conditions as in example 1. The results obtained with pure chlorodifluoromethane (R 22) in example 1 are mentioned by way of reference. The operating diagram of FIG. 2 does not alter the performances of the heat pump working with a pure fluid. The mixture specified in example 1 has the following molar composition: chlorodifluoromethane (R 22): 85% and trifluoromethane (R 23): 15%. The working cases A and B have been explained in example 1.

According to the operating diagram of FIG. 1, the selected mixture increases the thermal capacity of the plant, when operated with R 22, by 28% in case A and 30% in case B. The COP obtained with chlorodifluoromethane is also increased by 2.8% in case A and 5.2% in case B.

The diagram of FIG. 2 requires the additional investment corresponding to exchanger E 4, but this investment is low.

In the present example, this exchanger may be formed of two concentrical smooth tubes having a contact surface of 0.25 m².

TABLE III

| WORKING CONDITIONS | A | | B | |
|---|---|---|---|---|
| Fluid | R22 | R22/R23 | R22 | R22/R23 |
| Thermal power (W) | 14260 | 18324 | 14820 | 19268 |
| COP | 3.52 | 3.62 | 4.56 | 4.80 |
| Input pressure (bars) | 4.65 | 6.10 | 5.72 | 5.88 |
| Output pressure (bars) | 20.64 | 25.09 | 15.15 | 18.37 |

TABLE III-continued

| WORKING CONDITIONS | A | | B | |
|---|---|---|---|---|
| Compression rate | 4.44 | 4.11 | 3.37 | 3.13 |

EXAMPLE 3

The use of the azeotropic mixture R 502 instead of R 22 results in a substantially lower output temperature of the compressor and avoids overheating of the engine in the case of tight compressors. This advantage becomes important in the case of air/water heat pumps operated at very low outside temperatures.

The operation is conducted with an air/water heat pump using R 502; air is passed through the evaporator at a feed rate of 6000 m$^3$/h, at an inlet temperature of 7° C. and with a relative humidity of 86%. The water circulated through the condenser is heated from 45° to 50° C. The results of Table IV are obtained with a non-azeotropic mixture of 14% by mole of R 503 and 86% by mole of R 502.

TABLE IV

| FLUID | R502 | MIXTURE R502/R503 |
|---|---|---|
| Thermal power (W) | 11.932 | 13.531 |
| COP | 2.96 | 2.92 |
| Output temperature (°C.) | 85.2 | 88.7 |
| Input pressure (bars) | 5.53 | 6.47 |
| Output pressure (bars) | 21.85 | 25.20 |

The above mixture provides for a thermal capacity increase of 13.4% as compared to R 502, although the COP and the output pressure remain practically unchanged.

As a rule, the molar fraction of R 503 in a R502/R503 or R22/R503 mixture is preferably from 8% to 15%; in a R500/R503 or R12/R503 mixture it is preferably from 5 to 15%.

EXAMPLE 4

Other mixtures have been used in a heat pump of the water/water type and have resulted in an increased thermal power:
(a) 87% by mole of R 22 with 13% by mole of R 503
(b) 88% by mole of R 12 with 12% by mole of R 503
(c) 90% by mole of R 500 with 10% by mole of R 23
(d) 92% by mole of R 500 with 8% by mole of R 503
(e) 85% by mole of R 502 with 15% by mole of R 23
(f) 85% by mole of R 501 with 15% by mole of R 23
(g) 87% by mole of R 501 with 13% by mole of R 503

The following claims concern mixtures with two essential constituents, as described in the present patent application. It is clear that the invention also concerns mixtures containing, in addition to the above constituents, minor quantities (less than 5% by mole and preferably less than 1% by mole) of impurities which do not alter substantially the good behavior of these mixtures when used in heat pumps or for house thermal conditioning, these impurities being, for example, halogenated derivatives of hydrocarbons other than those claimed and which are by-products of the manufacture of the claimed halogenated derivatives.

What is claimed is:

1. In a cyclic process for heat condition a building by means of a compression heat pump operated with a working fluid, the process comprising the repeated successive steps of (a) compressing a gas phase of a working fluid, (b) cooling the compressed gas phase of the working fluid obtained in step (a), in contact with a cooling fluid at a temperature from about 20° to 75° C., to form a condensed liquid phase of the working fluid, (c) expanding the liquid phase of the working fluid obtained in step (b) and vaporizing at least a portion of the expanded liquid phase of step (c) in contact with a heating fluid at a temperature from about −15° to +40° C. to reconstitute the gas phase of step (a), the improvement comprising using as the working fluid a composition of:
(a) 95-80% by mole of
(i) R12 being dichlorodifluoromethane,
(ii) R500 being by weight 73.8% dichlorodifluoromethane and 26.2% difluoroethane, or
(iii) R501 being by weight 75% chlorodifluoromethane and 25% dichlorodifluoromethane; and
(b) 5-20% by mole of
(i) R23 being trifluoromethane, or
(ii) R503 being by weight 40.1% trifluoromethane and 59.9% chlorotrifluoromethane.

2. A process according to claim 1, wherein the composition comprises (a) 95% to 80% by mole of R12 with (b) 5% to 20% by mole of R23.

3. A process according to claim 1, wherein the composition comprises (a) 92% to 82% by mole of R12 or R500 with (b) 8% to 18% by mole of R23.

4. A process according to claim 1, wherein the composition comprises (a) 95% to 85% by mole of R12 or R500 with (b) 5% to 15% by mole of R503.

5. A process according to claim 1, wherein the working fluid is a composition of: (1) 92% to 82% by mole of R12 or R500 with 8% to 18% by mole of R23; or (2) 95% to 85% by mole of R12 or R500 with 5% to 15% by mole of R503; the cooling fluid is at a temperature of from about 40° to 75° C.; and the heating fluid is at a temperature higher than 5° C.

6. A process according to claim 1, wherein step (b) is conducted up to substantially complete condensation of the working fluid, the resultant substantially condensed working fluid is contacted in heat exchange relationship with a hereinafter defined cooling fluid (F), to subcool said substantially completely condensed working fluid, the subcooled working fluid is partly vaporized in step (d) and the resultant partly vaporized working fluid from step (d) is contacted, as said cooling fluid (F), with said substantially completely condensed, working fluid, and then recycled to step (a), the contact conditions between said fluid (F) and said substantially completely condensed working fluid being such as to complete the vaporization of the subcooled working fluid initiated in step (d).

* * * * *